United States Patent
Chaubey

(10) Patent No.: US 11,323,481 B2
(45) Date of Patent: May 3, 2022

(54) CLASSIFICATION OF UNKNOWN NETWORK TRAFFIC

(71) Applicant: Juniper Networks, Inc., Sunnyvale, CA (US)

(72) Inventor: Rajeev Chaubey, Karnataka (IN)

(73) Assignee: Juniper Networks, Inc., Sunnyvale, CA (US)

(*) Notice: Subject to any disclaimer, the term of this patent is extended or adjusted under 35 U.S.C. 154(b) by 427 days.

(21) Appl. No.: 16/415,638

(22) Filed: May 17, 2019

(65) Prior Publication Data

US 2020/0366717 A1 Nov. 19, 2020

(51) Int. Cl.
*H04L 29/06* (2006.01)
*G06N 20/00* (2019.01)

(52) U.S. Cl.
CPC ............ *H04L 63/20* (2013.01); *G06N 20/00* (2019.01); *H04L 63/02* (2013.01); *H04L 63/0245* (2013.01); *H04L 63/0281* (2013.01)

(58) Field of Classification Search
CPC ..... H04L 63/20; H04L 63/02; H04L 63/0245; H04L 63/0281; G06N 20/00
See application file for complete search history.

(56) References Cited

U.S. PATENT DOCUMENTS

| | | | |
|---|---|---|---|
| 8,539,221 B2 * | 9/2013 | Tremblay | H04L 47/2441 713/150 |
| 9,614,773 B1 | 4/2017 | Tagore | |
| 2013/0100849 A1 | 4/2013 | Szabo et al. | |
| 2014/0282823 A1 * | 9/2014 | Rash | H04L 63/20 726/1 |

(Continued)

FOREIGN PATENT DOCUMENTS

| | | |
|---|---|---|
| CN | 102394827 A | 3/2012 |
| CN | 109450740 A | 3/2019 |
| EP | 2584496 A1 | 4/2013 |

OTHER PUBLICATIONS

Yamansavascilar et al. "Application Identification via Network Traffic Classification", 2017, pp. 1-6, 2017 Workshop on Computing, Networking and Communications (CNC) IEEE (Year: 2017).*

(Continued)

*Primary Examiner* — Hee K Song
(74) *Attorney, Agent, or Firm* — Harrity & Harrity, LLP

(57) ABSTRACT

A network device may receive network traffic for an application. The network device may determine a first classification for the network traffic according to a first classification technique. The first classification may identify the network traffic as relating to a particular application or an unknown application. The network device may determine a second classification for the network traffic according to a second classification technique. The second classification may identify the network traffic as relating to an unknown application of a particular type and identity. The network device may process, based on whether the first classification identifies the network traffic as relating to the particular application or the unknown application, the network traffic according to a first security policy associated with the particular application or a second security policy associated with the unknown application of the particular type and identity.

20 Claims, 9 Drawing Sheets

(56) References Cited

U.S. PATENT DOCUMENTS

2017/0364794 A1    12/2017  Mahkonen et al.
2020/0104751 A1*    4/2020  Sesha ..................... H04L 41/16
2020/0296011 A1*    9/2020  Jain ....................... H04L 43/10

OTHER PUBLICATIONS

Bar-Yanai R., et al., "Realtime Classification for Encrypted Traffic," May 20, 2010, Experimental Algorithms, pp. 373-385, XP019142577.
Extended European Search Report for Application No. EP19181786.5, dated Oct. 16, 2019.
Goli Y.D., et al., "Network Traffic Classification Techniques—A Review," 2018 International Conference on Computational Techniques, Electronics and Mechanical Systems (CTEMS), IEEE. Dec. 21, 2018, pp. 219-222, XP033580860.
Jun et al., "Trusted Route Analysis Based on Intelligent Business Recognition," Telecommunications Science, Apr. 30, 2009, pp. 1-14.

\* cited by examiner

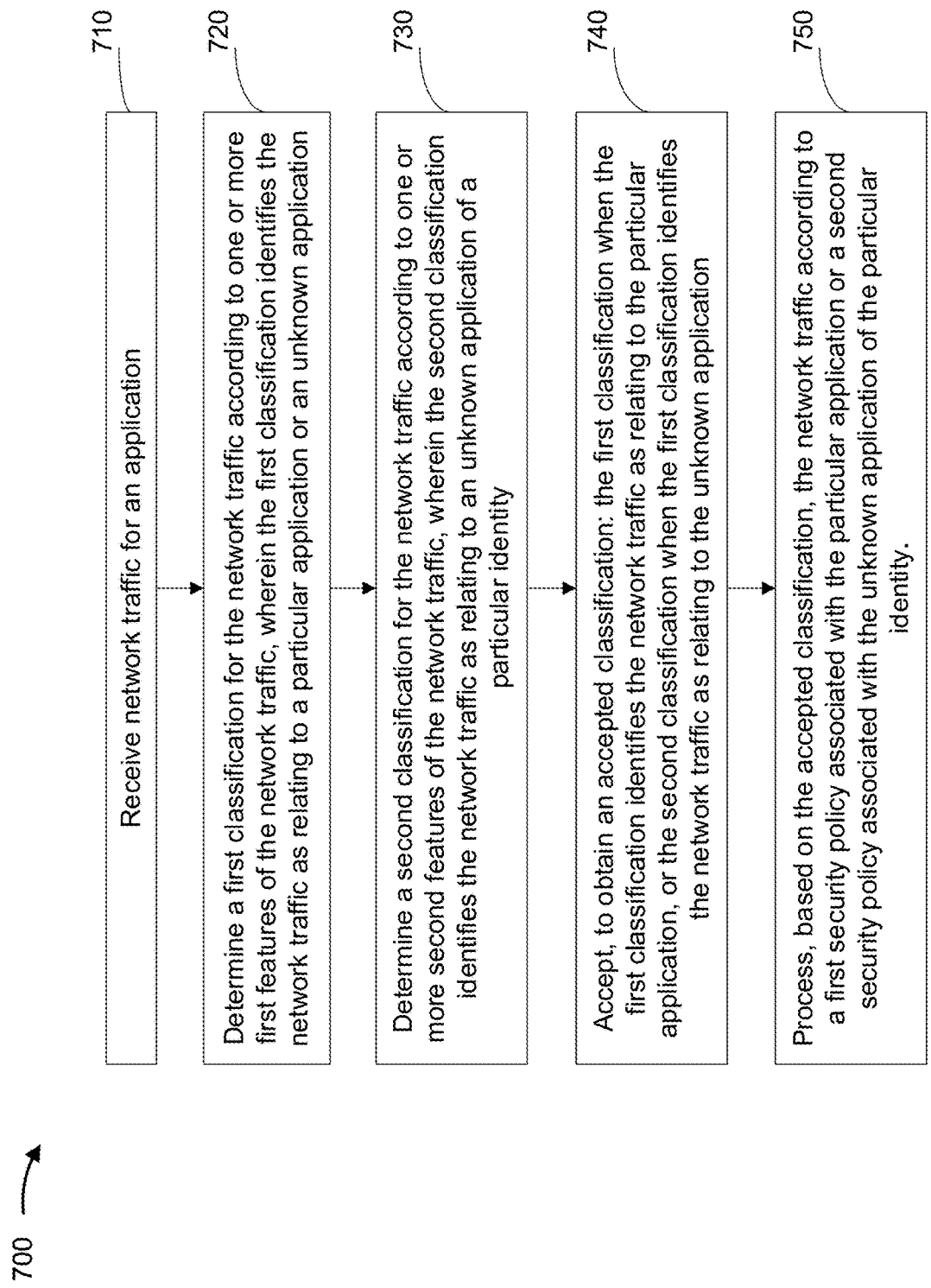

CLASSIFICATION OF UNKNOWN NETWORK TRAFFIC

BACKGROUND

Application identification may support network security and services, such as application-aware firewalls, application-aware traffic visibility and control, application-aware quality of service (QoS), application-aware rate limiting, application-based routing, or the like. Applications may be identified based on deep packet inspection (DPI) of network traffic. DPI may identify known applications using application signatures that have been generated (e.g., by DPI vendors).

SUMMARY

According to some implementations, a method may include receiving, by a network device, network traffic for an application. The method may include determining, by the network device, a first classification for the network traffic according to a first classification technique, wherein the first classification identifies the network traffic as relating to a particular application or an unknown application. The method may include determining, by the network device, a second classification for the network traffic according to a second classification technique, wherein the second classification identifies the network traffic as relating to an unknown application of a particular type and identity. The method may include processing, by the network device and based on whether the first classification identifies the network traffic as relating to the particular application or the unknown application, the network traffic according to a first security policy associated with the particular application or a second security policy associated with the unknown application of the particular type and identity.

According to some implementations, a network device may include one or more memories, and one or more processors to receive first network traffic for an application. The one or more processors may determine a first classification for the first network traffic according to a first classification technique, wherein the first classification identifies the first network traffic as relating to an unknown application of a particular type and identity. The one or more processors may process, based on the first classification, the first network traffic according to a security policy associated with the unknown application of the particular type and identity. The one or more processors may receive, after processing the first network traffic, second network traffic for the application. The one or more processors may determine a second classification for the second network traffic according to a second classification technique, wherein the second classification identifies the second network traffic as relating to a particular application. The one or more processors may associate, based on the second classification, the security policy, associated with the unknown application of the particular type and identity, with the particular application. The one or more processors may process the second network traffic according to the security policy.

According to some implementations, a non-transitory computer-readable medium may store instructions that include one or more instructions that, when executed by one or more processors of a network device, cause the one or more processors to receive network traffic for an application. The one or more instructions may cause the one or more processors to determine a first classification for the network traffic according to one or more first features of the network traffic, wherein the first classification identifies the network traffic as relating to a particular application or an unknown application. The one or more instructions may cause the one or more processors to determine a second classification for the network traffic according to one or more second features of the network traffic, wherein the second classification identifies the network traffic as relating to an unknown application of a particular identity. The one or more instructions may cause the one or more processors to accept, to obtain an accepted classification, the first classification when the first classification identifies the network traffic as relating to the particular application, or the second classification when the first classification identifies the network traffic as relating to the unknown application. The one or more instructions may cause the one or more processors to process, based on the accepted classification, the network traffic according to a first security policy associated with the particular application or a second security policy associated with the unknown application of the particular identity.

BRIEF DESCRIPTION OF THE DRAWINGS

FIGS. 5-7 are flow charts of example processes for classification of unknown network traffic.

DETAILED DESCRIPTION

Figure 1A:
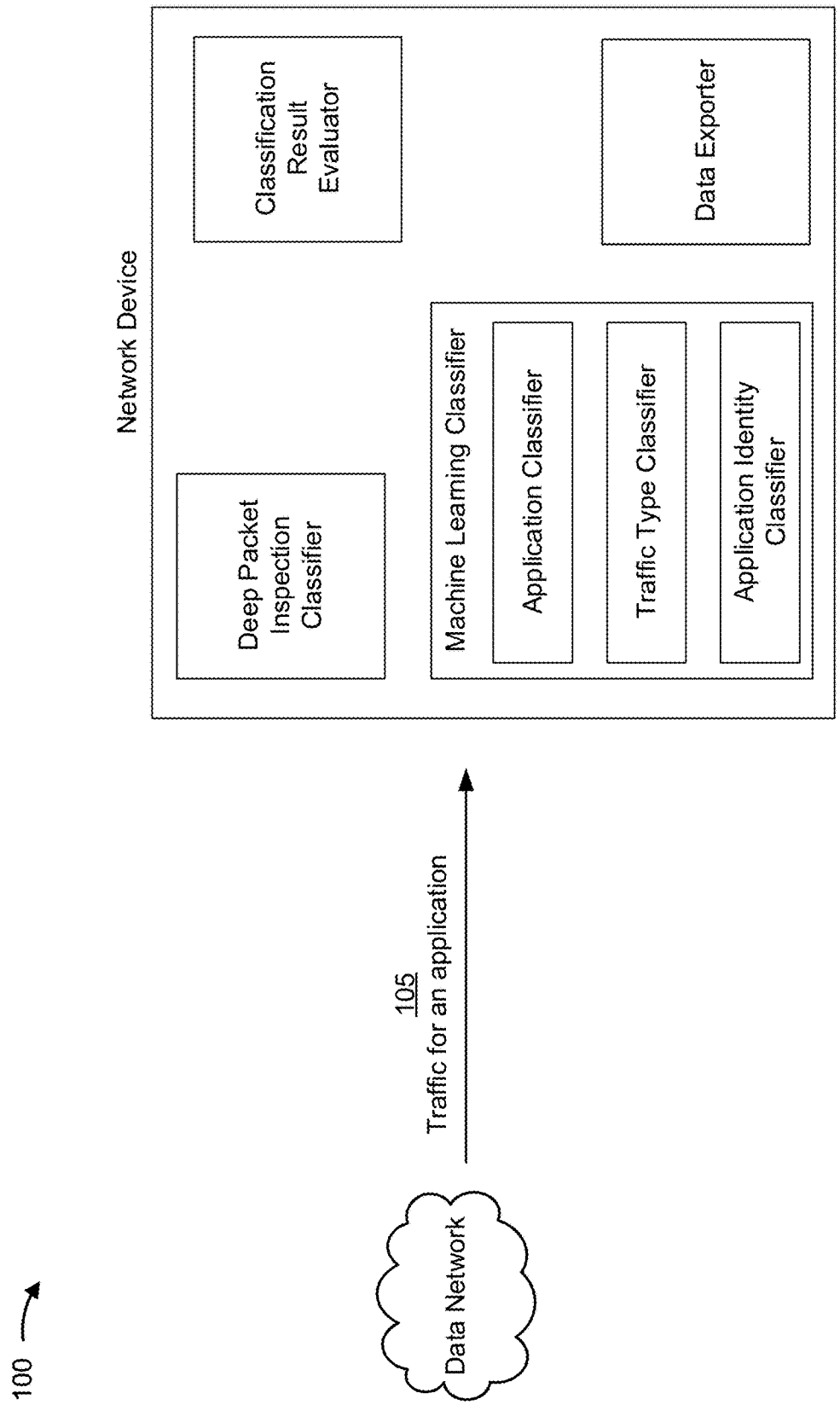
FIGS. 1A-1C are diagrams of one or more example implementations described herein.

The following detailed description of example implementations refers to the accompanying drawings. The same reference numbers in different drawings may identify the same or similar elements.

Application firewalls may identify traffic as being associated with an application and enforce a security policy for the application. For example, an application firewall may identify an application by a classification technique, such as DPI. DPI facilitates identification of an application based on an application signature associated with the application. For example, an application signature may include a string and/or a binary pattern that is unique to an application (e.g., within a protocol or a protocol context that is unique to an application). The application firewall may employ a library of application signatures to permit a DPI component of the application firewall to identify an application based on an application signature.

Sometimes, traffic for an application cannot be identified according to an application signature known to the application firewall. For example, this may occur if the traffic is encrypted. Encrypted traffic, such as most traffic to and from the Internet, has become commonplace, and as a result, DPI may classify a significant portion of traffic as relating to unknown applications. In such a case, the application firewall may apply a security policy designated for unknown applications (such as allowing or blocking packets associated with unknown applications) to the traffic. However, applying such a broad security policy to a substantial portion of traffic reduces an efficacy of the application firewall.

For example, legitimate traffic may be blocked by a broad security policy for unknown applications, thereby causing certain devices of a network to become unreachable or unable to communicate outside of the network. As a consequence, communications associated with such devices may experience disruptions and become less reliable. As another example, malicious traffic may be allowed by a broad security policy for unknown applications (e.g., a policy that allows traffic from such applications), thereby making the network more vulnerable to security threats. This may result in diverted computing resources and network congestion (e.g., when a device is infected with software that causes the device to send spam email or engage in a distributed denial of service (DoS) attack) as well as lead to compromises of sensitive data (e.g., private video feeds, personally identifying information, transaction card identifiers, and/or the like).

Some implementations described herein provide a network device that performs a DPI classification technique and a machine learning (ML) classification technique on network traffic. Traffic that is classified by the DPI classification technique as an unknown application may be classified according to a classification determined by the ML classification technique. For example, the ML classification technique may classify traffic as being associated with an unknown application that is of a particular type and identity. The network device may process the traffic according to a security policy associated with the unknown application of the particular type and identity. Furthermore, if the unknown application is later identified as a particular application by the DPI classification technique (e.g., based on subsequent network traffic for the unknown application) the security policy and other data of the network device associated with the unknown application of the particular type and identity may be updated and associated with the particular application.

In this way, the network device facilitates a granular administration of security policies for unknown applications. For example, rather than classifying an unknown application merely as unknown (a broad category that may encompass numerous applications with various characteristics), the ML classification technique can classify an unknown application according to a particular type of traffic (e.g., streaming video, file upload, email, and/or the like) associated with the unknown application. In addition, the ML classification technique can further differentiate between multiple unknown applications of a same traffic type by associating an unknown application with a particular identity (e.g., "unknown video 25" or "unknown video 103"). In this way, the network device can enforce a security policy that is specific to, or otherwise intended for, a particular unknown application, thereby improving an efficacy of the network device.

Furthermore, the network device is able to maintain a security policy and/or records in association with a particular unknown application. This permits the network device to efficiently reconcile the security policy and/or the records when an unknown application later becomes known as a particular application. For example, rather than generating a new security policy for the particular application or starting with no record of a behavior of the particular application, the network device can associate the security policy and the records of the particular unknown application with the particular application. Accordingly, the network device facilitates efficient processing and review of newly-identified network traffic, thereby conserving computing resources (e.g., processing resources, memory resources, and/or the like).

Figure 1B:
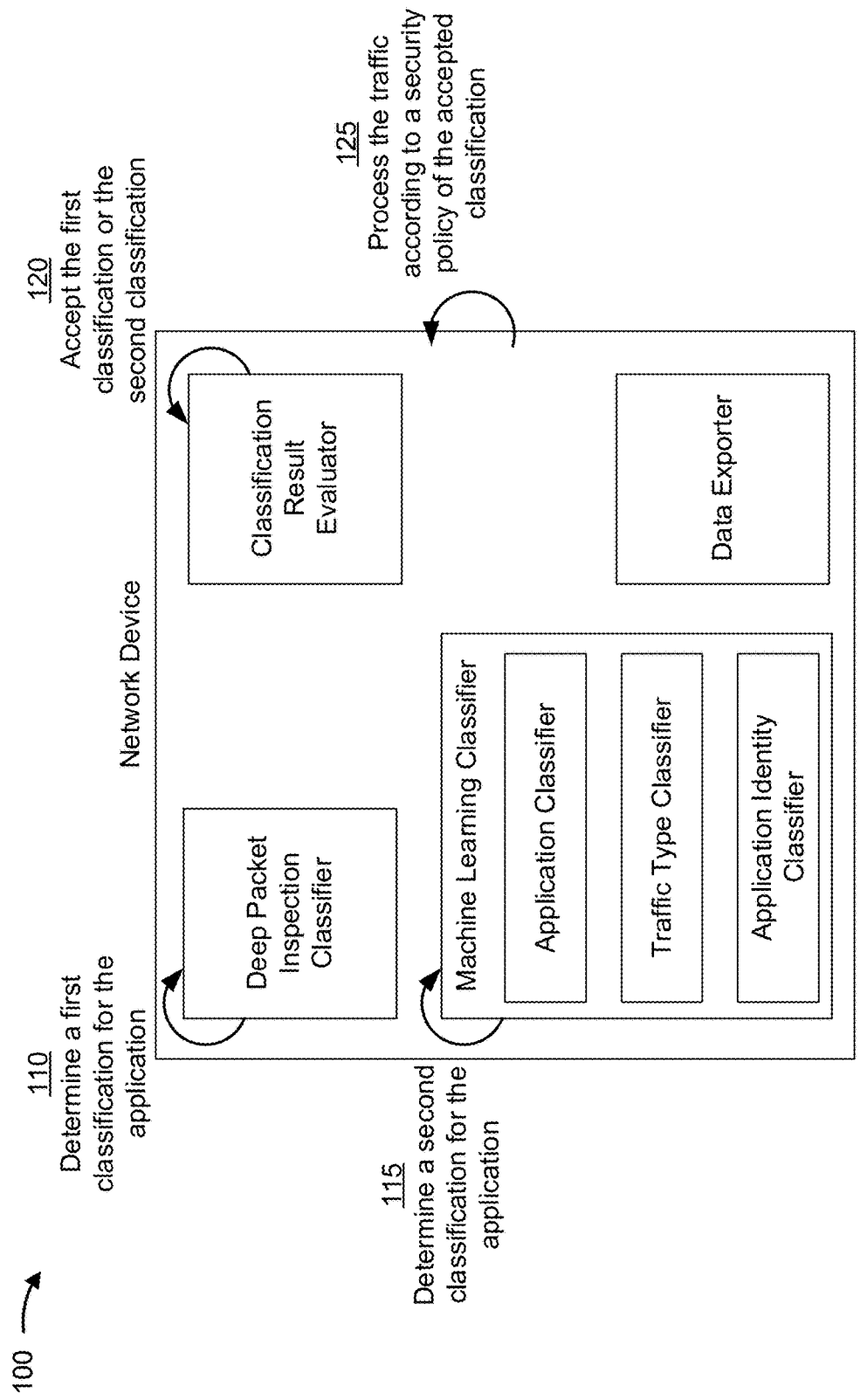
Figure 1C:
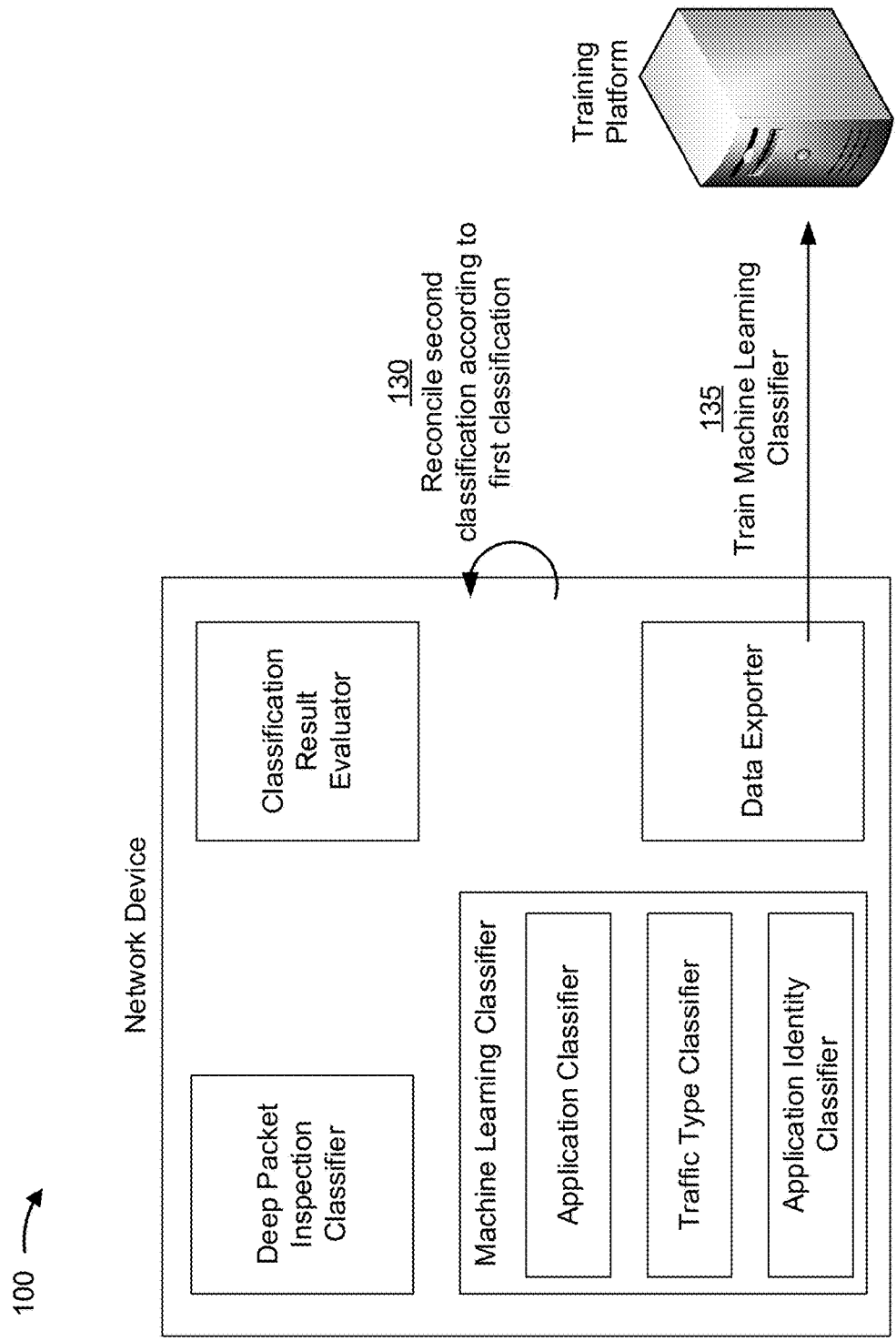

FIGS. 1A-1C are diagrams of one or more example implementations 100 described herein. As shown in FIGS. 1A-1C, example implementation(s) 100 may include a network device and a training platform. The network device may be a firewall, a gateway, a router, and/or the like. The network device may communicate with a data network, such as the Internet.

The network device may perform packet filtering on inbound and/or outbound communications with the data network according to a DPI classification technique and a ML classification technique. In some implementations, the network device may include a DPI classifier component to perform the DPI classification technique and a ML classifier component to perform the ML classification technique. The ML classifier component may include an application classifier, a traffic type classifier, and an application identity classifier. In some implementations, the ML classifier component may include one or more additional classifiers. Outputs of the DPI classifier component and the ML classifier component may be provided to a classification result evaluator component of the network device. The classification result evaluator component may determine a security policy that is to be enforced with regard to the communications, based on the outputs.

In some implementations, the network device may be associated with a training platform that uses data from the network device to train ML models for the application classifier, the traffic type classifier, and the application identity classifier. For example, a data exporter component of the network device may provide data to the training platform to permit the training platform to train the one or more classification models.

As shown in FIG. 1A, and by reference number 105, the network device may receive network traffic for an application. For example, the traffic may be composed of one or more packets. A packet may include a header and a payload. The header may identify source and destination network addresses, error detection codes, and sequencing information. The payload may provide a content of the packet.

As shown in FIG. 1B, and by reference number 110, the network device may determine a first classification for the traffic (e.g., using a first classification technique). The first classification technique may determine the first classification for the traffic based on one or more features of the traffic. The first classification may classify the traffic as being associated with a particular application (e.g., "Email Application ABC") or an unknown application.

In some implementations, the first classification technique may be a DPI classification technique, and the network device may use a DPI classifier component to perform the DPI classification technique. The DPI classification technique may identify known applications based on application signatures that have been generated (e.g., by DPI vendors) for known applications. For example, the network device (e.g., using the DPI classifier component) may determine whether a string and/or a binary pattern of the traffic corresponds to a string and/or a binary pattern defined in an application signature. If a correspondence is determined, the network device may classify the traffic as being associated with a particular application (e.g., a particular application associated with the application signature). Otherwise, the network device may classify the traffic as being associated with an unknown application.

As shown by reference number 115, the network device may determine a second classification for the traffic (e.g., using a second classification technique). The second classification technique may determine the second classification for the traffic based on one or more features of the traffic. In some implementations, one or more first features used by the first classification technique may be different from one or more second features used by the second classification technique (e.g., at least one feature is not shared by the one or more first features and the one or more second features). Accordingly, the first classification technique and the second classification technique may be different. The second classification may identify the application as a particular application (e.g., "Email Application ABC") or an unknown application of a particular type and identity (referred to herein as a "particular unknown application," e.g., "unknown email 53").

In some implementations, the second classification technique may be a ML classification technique, and the network device may use a ML classifier component to perform the ML classification technique. The ML classifier component may employ one or more ML models to identify the traffic as being associated with a particular application or a particular unknown application. In some implementations, the network device may determine one or more features relating to the traffic (e.g., relating to a flow of the traffic and/or an encryption of the traffic) and may process the one or more features using the one or more ML models to determine a classification for the traffic.

In some implementations, a feature relating to the traffic may relate to portions of one or more packets (e.g., a first 50 bytes of a payload of a packet, a first 500 bytes, a first 1000 bytes, and/or the like) of the traffic. In addition, features relating to the traffic may relate to a flow of the traffic. In some implementations, a feature relating to the flow of the traffic may relate to a sequence of packet lengths (e.g., in bytes) and/or arrival times (e.g., an arrival time of a packet relative to an arrival time of a previous packet) for a particular number of packets of the traffic. Additionally, or alternatively, a feature relating to the flow of the traffic may relate to transitions in packet sizes. For example, transitions from smaller packets (e.g., packets that do not satisfy a threshold size) to larger packets (e.g., packets that do satisfy a threshold size), a degree of the transitions (e.g., in bytes or as a percentage), a number of the transitions, and/or the like. Additionally, or alternatively, a feature relating to the flow of the traffic may relate to transitions in packet arrival times—for example, pauses (e.g., pauses of a duration satisfying a threshold value) between arrivals of packets, durations of the pauses, a number of the pauses, and/or the like.

In addition, features relating to the traffic may relate to an encryption of the traffic. In some implementations, a feature relating to the encryption of the traffic may relate to a type of encryption (e.g., an encryption based on the secure sockets layer (SSL) protocol, the transport layer security (TLS) protocol, and/or the like, which may be identified by a byte pattern), a cipher suite designated by a client in a handshake, a cipher suite designated by a server in the handshake, encryption extensions (e.g., a type of an extension and/or a length of an extension), a public key length, a server certificate, a handshake type, an encryption record length and/or type (e.g., client to server or server to client), an encryption record time (e.g., client to server or server to client), and/or the like.

In some implementations, the ML classification technique may determine whether the traffic is associated with a particular application. For example, an application classifier of the ML classifier component of the network device may classify the traffic as being associated with a particular application. This may be useful to confirm a classification determined by the DPI classification technique. For example, the DPI classification technique may incorrectly classify traffic when the traffic spoofs an application signature associated with a known application. Accordingly, the application classifier of the ML classifier component may provide a secondary classification of the traffic according to features relating to a flow of the traffic and/or an encryption of the traffic (which cannot be spoofed).

The application classifier of the ML classifier component may include an application classifier model. In some implementations, the application classifier model may be a supervised or a semi-supervised artificial neural network, such as a multi-layer perceptron or a convolutional neural network. The application classifier model may receive, as input, features relating to the traffic (e.g., a flow of the traffic, an encryption of the traffic, and/or the like), and may provide, as output, a particular application (e.g., an application identifier, an application name, and/or the like) that is identified from the input. If a particular application cannot be identified by the application classifier model, the application classifier model may provide an output indicating that the input is associated with an unknown application.

When the application classifier determines that the traffic is associated with a particular application, further processing of the traffic according to the ML classification technique may not be needed. However, when the application classifier determines that the traffic is associated with an unknown application, the ML classifier component of the network device may process the traffic using a traffic type classifier and an application identity classifier. The traffic type classifier may identify an unknown application as being associated with a particular type of traffic (e.g., streaming video, file upload, email, chat, peer-to-peer, and/or the like). The application identity classifier may identify an unknown application (e.g., an unknown application classified as a particular type) as being associated with a particular identity (e.g., an identity based on features of the traffic that are characteristics of the unknown application).

For example, assume that the network device is receiving traffic that includes three traffic flows that are classified as being associated with unknown applications by the DPI classifier component and the application classifier of the ML classifier component. Based on features relating to the traffic (e.g., a flow of the traffic and/or an encryption of the traffic), the traffic type classifier of the ML classifier component may classify one of the traffic flows as being associated with email traffic (e.g., "unknown email") and two of the traffic flows as being associated with streaming video traffic (e.g., "unknown video"). In addition, based on features relating to the traffic (e.g., one or more features upon which the traffic type classifier classifications are based, or one or more different features), the application identity classifier of the ML classifier component may assign a traffic flow to a cluster (e.g., a cluster associated with a unique identity). For example, regarding the two traffic flows classified as streaming video, the application identity classifier may identify a first of the traffic flows as being associated with a first particular identity (e.g., "unknown video 25") and a second of the traffic flows as being associated with a second particular identity (e.g., "unknown video 103"). In this way, the ML classification technique can determine that an unknown application is a particular unknown application.

The network device may use an output of the ML classifier component (e.g., "unknown video 25") as an identifier for a particular unknown application (e.g., "unknown video 25" may identify a first particular unknown application and "unknown video 103" may identify a second particular unknown application). In some implementations, an identifier may also include additional information about the traffic, such as an encryption or a protocol (e.g., a protocol associated with layers 4-7 of the Open Systems Interconnection (OSI) model) associated with the traffic (e.g., "unknown TLS video 25"). An identifier may be determined according to a schema for labelling particular unknown applications (e.g., "unknown"-<protocol>-<encrypted or not encrypted>-<traffic type>). An identifier may be used for logging characteristics of traffic associated with a particular unknown application, associating a security policy with the particular unknown application, enforcing the security policy for traffic associated with the particular unknown application, and/or the like. In this way, traffic for a particular unknown application can be processed and/or logged by the network device in a manner similar to traffic associated with a known application.

The traffic type classifier of the ML classifier component may include a traffic type classifier model. In some implementations, the traffic type classifier model may employ a supervised or a semi-supervised artificial neural network, such as a multi-layer perceptron or a convolutional neural network. The traffic type classifier model may receive, as input, features relating to the traffic (e.g., a flow of the traffic, an encryption of the traffic, and/or the like), and may provide, as output, a particular type of traffic (e.g., streaming video, file upload, email, and/or the like) that is identified from the input. Particular types of traffic that the traffic type classifier model is capable of identifying may change over time as the traffic type classifier model learns to identify new traffic types.

The application identity classifier of the ML classifier component may include an application identity classifier model. In some implementations, the application identity classifier model may employ an unsupervised, two-stage machine learning technique. A first stage of the machine learning technique may employ a multi-layer perceptron, a convolutional neural network-based auto-encoder, and/or the like, and a second stage of the machine learning technique may employ a k-means clustering algorithm, or the like. For example, according to a first stage, the application identity classifier model may receive, as input, features relating to the traffic (e.g., a flow of the traffic, an encryption of the traffic, and/or the like) as well as an output of the traffic type classifier model (e.g., an output that identifies a particular type of traffic), and may provide, as output, a vector representing a set of features learned from the input and relating to an identity of an unknown application. Continuing with the previous example, according to a second stage, the application identity classifier model may receive, as input, the output of the first stage (e.g., a vector including a set of learned features), and may provide, as output, a cluster (e.g., "video 25") to which an unknown application belongs (e.g., an existing cluster or a new cluster created for the unknown application).

As shown by reference number 120, the network device may accept the DPI classification (e.g., determined by the DPI classification technique) or the ML classification (e.g., determined by the ML classification technique).

The network device may accept the DPI classification of the traffic when the DPI classification identifies the traffic as a particular application and the ML classification identifies the traffic as an unknown application (e.g., the application classifier of the ML classifier component identifies the traffic as an unknown application). Similarly, the network device may accept the ML classification of the traffic when the DPI classification identifies the traffic as being associated with an unknown application and the ML classification identifies the traffic as being associated with a particular application (e.g., the application classifier of the ML classifier component identifies the traffic as being associated with a particular application).

In some implementations, both the DPI classification and the ML classification (e.g., the ML classification determined by the application classifier of the ML classifier component) may classify the traffic as being associated with a particular application (e.g., a same particular application). In such a case, the network device may accept the DPI classification and the ML classification of the traffic as being associated with the particular application.

In some implementations, the DPI classification may classify the traffic as being associated with a first particular application and the ML classification (e.g., the ML classification determined by the application classifier of the ML classifier component) may classify the traffic as being associated with a second particular application. In some implementations, when the traffic is not encrypted, the DPI classification technique may be more reliable than the ML classification technique, and the network device may accept the DPI classification (e.g., according to a default behavior); when the traffic is encrypted, the ML classification technique may be more reliable than the DPI classification technique, and the network device may accept the ML classification (e.g., according to a default behavior). In some implementations, the network device may employ another criteria (e.g., using a machine learning model) to determine whether to accept the DPI classification or the ML classification. This may result in the network device accepting the DPI classification when the traffic is encrypted and/or accepting the ML classification when the traffic is not encrypted.

In some implementations, the DPI classification may classify the traffic as being associated with an unknown application and the ML classification (e.g., the ML classification determined by the traffic type classifier and the application identity classifier of the ML classifier component) may classify the traffic as being associated with a particular unknown application (e.g., an unknown application of a particular type and identity). In such a case, the network device may accept the ML classification of the traffic as being associated with the particular unknown application.

Accordingly, an accepted classification may correspond to a particular application or a particular unknown application (e.g., an unknown application of a particular type and identity). In some implementations, the network device may use a classification result evaluator component to determine whether to accept the DPI classification or the ML classification. The classification result evaluator component of the network device may output the accepted classification of the DPI classification and the ML classification to permit the network device to process the traffic according to the accepted classification. In a case when the DPI classification is the accepted classification, the network device may provide data relating to the DPI classification and features of the traffic to a training platform to permit training of the ML classifier component, as described below.

As shown by reference number 125, the network device may process the traffic according to a security policy associated with the accepted classification. For example, when the accepted classification is a particular application (e.g., "Email Application ABC"), the network device may process the traffic according to a security policy associated with the particular application (e.g., a security policy associated with "Email Application ABC"). As another example, when the accepted classification is a particular unknown application (e.g., an unknown application of a particular type and identity), the network device may process the traffic according to a security policy associated with the particular unknown application (e.g., a security policy associated with "unknown video 25").

In some implementations, when the accepted classification is a particular unknown application, the network device may process the traffic according to a security policy associated with a particular type (e.g., traffic type) of the particular unknown application. For example, the network device may process traffic of a particular unknown application that is an unknown video according to a particular security policy that is configured for unknown videos. In some implementations, an administrator of the network device may determine a security policy for a particular traffic type and provide the security policy to the network device (e.g., via a command line interface). For example, an administrator of the network device may configure a security policy for a particular traffic type (e.g., a particular traffic type previously unrecognized by the network device) based on data relating to the particular traffic type (e.g., data relating to features of the flow of the traffic and/or the encryption of the traffic, and/or the like). In this way, default security policies can be configured for new traffic types learned by the traffic type classifier model.

In some implementations, an administrator of the network device may determine a security policy for a particular application or a particular unknown application and provide the security policy to the network device (e.g., via a command line interface). For example, upon identifying a particular unknown application, the network device may provide (e.g., export) data relating to the particular unknown application (e.g., data relating to features of the flow of the traffic and/or the encryption of the traffic, a type of the traffic, an identifier of the particular unknown application, and/or the like) to permit an administrator of the network device to configure a security policy for the particular unknown application.

Alternatively, the network device may generate (e.g., automatically generate) a security policy based on one or more characteristics of the particular application or a particular unknown application (e.g., a source of an application, a type of the application, a traffic pattern associated with the application, and/or the like). For example, the network device may generate a security policy for the particular application or the particular unknown application based on a security policy of a related application having characteristics similar to the one or more characteristics of the particular application or the particular unknown application.

In some implementations, the network device may generate (e.g., automatically generate) a security policy for the particular application or the particular unknown application based on sets of criteria. A set of criteria may relate to a type of the traffic, a source of the traffic, a destination of the traffic, a user associated with the traffic, a flow of the traffic, an encryption of the traffic, a frequency of the traffic, and/or the like. A set of criteria may be associated with an action for generating a security policy. For example, the action may indicate that the network device is to generate a security policy that denies the traffic, allows the traffic, quarantines the traffic, and/or the like. In some implementations, a set of criteria may be designated for a particular type of traffic and/or a particular type of encryption (e.g., a set of criteria may be designated for unknown encrypted upload traffic). The network device may determine whether traffic (e.g., traffic associated with a particular unknown application) corresponds to a set of criteria, and generate a security policy in accordance with the action associated with the set of criteria (e.g., based on determining that the traffic corresponds to the set of criteria).

In some implementations, the network device may log information relating to the particular application or the particular unknown application of the accepted classification. For example, the network device may log information relating to traffic associated with the particular application or the particular unknown application (e.g., a source address of the traffic, a destination address of the traffic, a time of the traffic, a manner in which the network device processed the traffic, and/or the like). The network device may log the information in a manner that associates the information with the particular application or the particular unknown application. For example, the network device may log the information in association with an identifier of the particular application or the particular unknown application.

As shown in FIG. 1C, and by reference number 130, the network device may reconcile a ML classification (e.g., a ML classification that identifies a particular unknown application) with a DPI classification (e.g., a DPI classification that identifies a particular application). For example, after classifying the traffic as relating to a particular unknown application (e.g., according to the ML classification technique), the network device may receive subsequent traffic for the application and may classify, using the DPI classification technique, the subsequent traffic as being associated with a particular application. Such a scenario may occur when an application signature for the application is not known to the DPI classifier component of the network device when initial traffic for the application is received (e.g., resulting in a classification of the traffic as a particular unknown application), but is later obtained before subsequent traffic for the application is received.

In such a case, the DPI classification technique may classify the subsequent traffic as a particular application (e.g., according to the application signature) while the ML classification technique may classify the subsequent traffic as a particular unknown application (e.g., because the ML classifier component has not been trained to recognize that the subsequent traffic is associated with the particular application). Based on these classifications, the network device may identify an output of the ML classifier component for the particular unknown application (e.g., "unknown video 25") as an alias for the particular application (e.g., "Email Application ABC"). Accordingly, the network device may reconcile the ML classification with the DPI classification.

For example, the network device may update a security policy associated with the particular unknown application to be associated with the particular application. In this way, the network device can enforce a security policy for the particular application without generating a new security policy for the particular application, thereby conserving computing resources.

As another example, the network device may update an application signature associated with the particular application to indicate that an output of the ML classifier component for the particular unknown application (e.g., "unknown video 25") is an alias for the particular application. In such a case, the network device may include an entry (e.g., in an alias list) for an application signature of the particular unknown application (e.g., an application signature determined by the ML classifier component) that identifies an association with the particular application, and/or may include an entry (e.g., in an alias list) for an application signature of the particular application that identifies an association with the particular unknown application. As a further example, the network device may generate a record (e.g., a syslog or an IPFIX record) that maps an output of the ML classifier component for the particular unknown application (e.g., "unknown video 25") to the particular application. In this way, historical logs or other records relating to the particular unknown application can be associated with the particular application. This may be useful for forensic purposes. For example, if the particular application is malware, historical traffic information relating to the particular application can be identified using a mapping of the particular unknown application to the particular application.

As shown by reference number 135, the network device may export data to a training platform to permit training of the ML classifier component. For example, the network device may export data to the training platform using a data exporter component of the network device. The data exported to the training platform may include data relating to the traffic (e.g., a flow of the traffic and/or an encryption of the traffic), data relating to a classification of the traffic according to the DPI classification technique, data relating to an association between a particular application and a particular unknown application, and/or the like. In some implementations, a plurality of network devices may export such data to the training platform to permit training of the ML classifier component.

The training platform may use the data to train (e.g., tune) the application classifier model, the traffic type classifier model, and/or the application identity classifier model. For example, the training platform may train the models using information relating to a plurality of traffic flows, a plurality of DPI classifications associated with the plurality of traffic flows, and/or a plurality of ML classifications associated with the DPI classifications. As an example, the training platform may determine that features of past traffic flows are associated with a threshold probability of being associated with a particular application or a particular unknown application. In some implementations, the training platform may use a scoring system (e.g., with relatively high scores and/or relatively low scores) to identify and/or classify traffic flows as being associated with a particular application or a particular unknown application. In this case, the training platform may determine that a relatively high score (e.g., as being likely to be identified) is to be assigned to traffic flows that are determined to be the same or similar as previously identified traffic flows of the particular application or the particular unknown application. In contrast, the training platform may determine that a relatively low score (e.g., as being unlikely to be identified) is to be assigned to traffic flows that are determined to be different than past identified traffic flows of the particular application or the particular unknown application.

In some implementations, the training platform may perform a training operation when generating the models. For example, the training platform may portion traffic flows into a training set (e.g., a set of data to train the models), a validation set (e.g., a set of data used to evaluate a fit of the models and/or to fine tune the models), a test set (e.g., a set of data used to evaluate a final fit of the models), and/or the like. In some implementations, the training platform may preprocess and/or perform dimensionality reduction to reduce features of the traffic flows to a minimum feature set. In some implementations, the training platform may train the models on this minimum feature set, thereby reducing processing to train the models, and may apply a classification technique, to the minimum feature set.

In some implementations, the training platform may use a classification technique, such as a logistic regression classification technique, a random forest classification technique, a gradient boosting machine learning (GBM) technique, and/or the like, to determine a categorical outcome (e.g., that a feature of a traffic flow corresponds, or does not correspond, to a particular application or a particular unknown application). Additionally, or alternatively, the training platform may use a naïve Bayesian classifier technique. In this case, the training platform may perform binary recursive partitioning to split the data of the minimum feature set into partitions and/or branches and use the partitions and/or branches to perform predictions (e.g., that a feature of a traffic flow corresponds, or does not correspond, to a particular application or a particular unknown application). Based on using recursive partitioning, the training platform may reduce utilization of computing resources relative to manual, linear sorting and analysis of data points, thereby enabling use of thousands, millions, or billions of data points to train a model, which may result in a more accurate model than using fewer data points.

Additionally, or alternatively, the training platform may use a support vector machine (SVM) classifier technique to generate a non-linear boundary between data points in the training set. In this case, the non-linear boundary is used to classify test data (e.g., data relating traffic flows) into a particular class (e.g., a class indicating that the traffic flows correspond to a particular application or a particular unknown application, a class indicating that the traffic flows do not correspond to a particular application or a particular unknown application, and/or the like).

Additionally, or alternatively, the training platform may train the models (e.g., the application classifier model and/or the traffic type classifier model) using a supervised training procedure that includes receiving input to the models from a subject matter expert, which may reduce an amount of time, an amount of processing resources, and/or the like to train the models relative to an unsupervised training procedure. In some implementations, the training platform may use one or more other model training techniques, such as a neural network technique, a latent semantic indexing technique, and/or the like. For example, the training platform may perform an artificial neural network processing technique (e.g., using a two-layer feedforward neural network architecture, a three-layer feedforward neural network architecture, and/or the like) to perform pattern recognition with regard to patterns of whether traffic flows that are different relate to a same particular application or particular unknown application. In this case, using the artificial neural network processing technique may improve an accuracy of the models generated by the training platform by being more robust to noisy, imprecise, or incomplete data, and by enabling the training platform to detect patterns and/or trends undetectable to human analysts or systems using less complex techniques.

As an example, the training platform may use a supervised multi-label classification technique to train the models (e.g., the application classifier model and/or the traffic type classifier model). For example, as a first step, the training platform may map traffic flows to a particular application or a particular unknown application. In this case, the traffic flows may be characterized as being associated with a particular application or a particular unknown application or not a particular application or a particular unknown application based on features of the traffic flows (e.g., whether a feature of a traffic flow is similar or associated with a feature of a particular application or a particular unknown application) and an analysis of the traffic flows (e.g., by a technician, thereby reducing processing relative to the training platform being required to analyze each activity). As a second step, the training platform may determine classifier chains, whereby labels of target variables may be correlated (e.g., in this example, labels may be features of traffic flows and correlation may refer to an association to a common particular application or particular unknown application). In this case, the training platform may use an output of a first label as an input for a second label (as well as one or more input features, which may be other data relating to particular applications or particular unknown applications), and may determine a likelihood that a particular traffic flow that includes a set of features (some of which are associated with a particular application or a particular unknown application and some of which are not associated with the particular application or the particular unknown application) are associated with the particular application or the particular unknown application based on a similarity to other traffic flows that include similar features. In this way, the training platform transforms classification from a multilabel-classification problem to multiple single-classification problems, thereby reducing processing utilization. As a third step, the training platform may determine a Hamming Loss Metric relating to an accuracy of a label in performing a classification by using the validation set of the data. For example, an accuracy with which a weighting applied to each feature and whether each feature is associated with a particular application or a particular unknown application, results in a correct prediction of whether a traffic flow corresponds to a particular application or a particular unknown application, thereby accounting for differing amounts to which association of any one feature influences a traffic flow being classified as associated with a particular application or a particular unknown application. As a fourth step, the training platform may finalize the models based on labels that satisfy a threshold accuracy associated with the Hamming Loss Metric and may use the models for subsequent prediction of whether features of a traffic flow are to result in the traffic flow being classified as associated with a particular application or a particular unknown application.

As another example, the training platform may determine, using a linear regression technique, that a threshold percentage of features, in a set of features, are not associated with a particular application or a particular unknown application, and may determine that those features are to receive relatively low association scores. In contrast, the training platform may determine that another threshold percentage of features are associated with a particular application or a particular unknown application and may assign a relatively high association score to those features. Based on the features being associated with (or not associated with) a particular application or a particular unknown application, the training platform may generate the models and may use the models for analyzing new features that the training platform identifies.

After performing a training operation for the application classifier model, the traffic type classifier model, and/or the application identity classifier model, or at another interval (e.g., daily, weekly, monthly, and/or the like), the training platform may generate a package that includes the application classifier model, the traffic type classifier model, the application identity classifier model, and/or one or more updates thereto. The network device may obtain the package from the training platform and update the ML classifier component of the network device with the package. In this way, classifications performed by the ML classifier component of the network device can be improved over time.

As indicated above, FIGS. 1A-1C are provided merely as one or more examples. Other examples may differ from what is described with regard to FIGS. 1A-1C.

Figure 2:
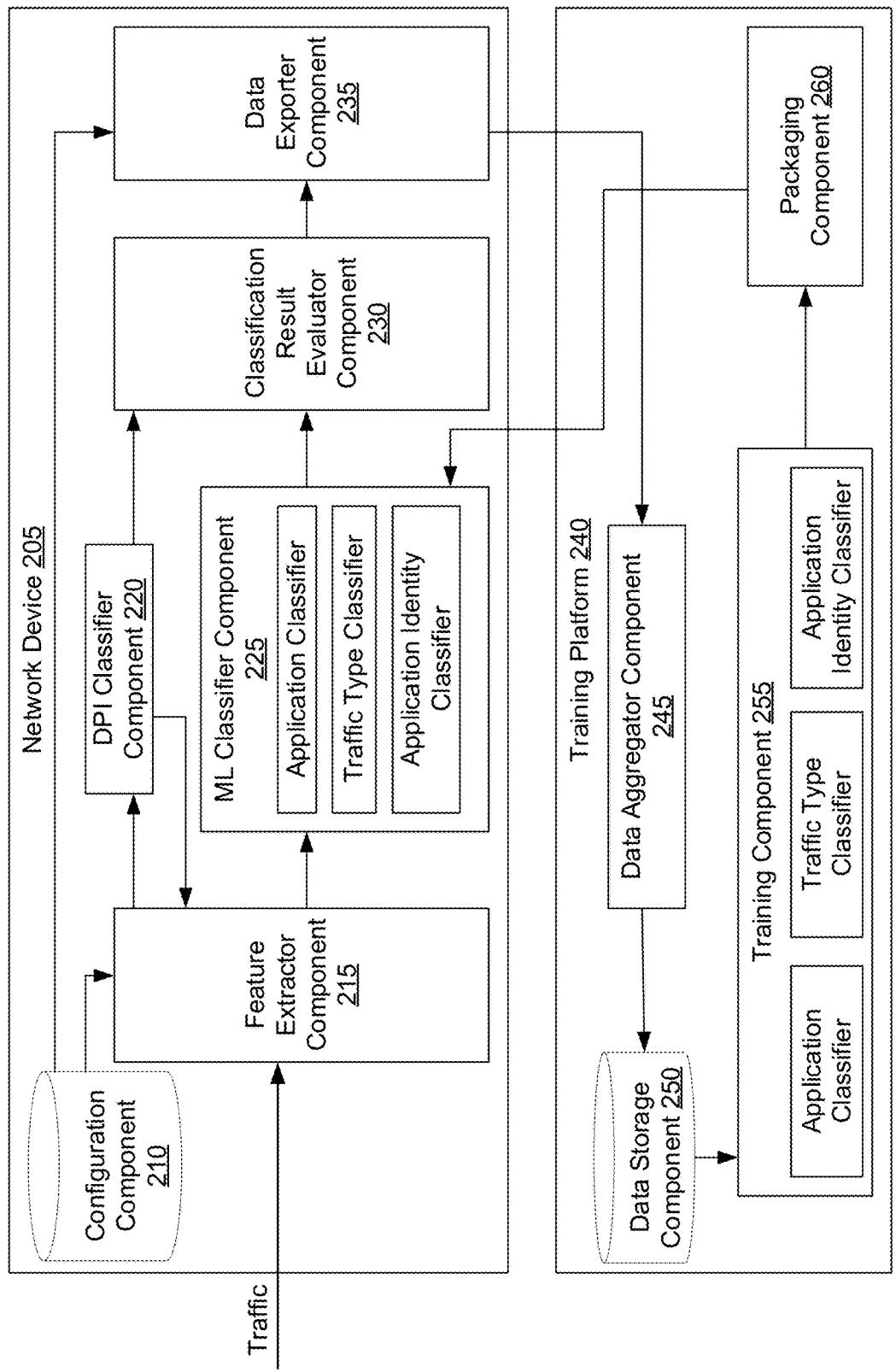
FIG. 2 is a diagram of an example implementation described herein.

FIG. 2 is a diagram of an example implementation 200 described herein. As shown in FIG. 2, network device 205 may include a configuration component 210, a feature extractor component 215, a DPI classifier component 220, a ML classifier component 225, a classification result evaluator component 230, and a data exporter component 235.

Network device 205, using configuration component 210, may store information identifying features that are to be extracted from traffic received by network device 205. Configuration component 210 may include a data structure (e.g., a database, a linked list, a table, and/or the like) used to store the information. Network device 205, using feature extractor component 215, may extract features from traffic received by network device 205 (e.g., according to the features identified by configuration component 210). The features may relate to a source address (e.g., Internet protocol (IP) address), a source port number, a destination address (e.g., IP address), a destination port number, a routing instance associated with the traffic, a transport layer protocol (e.g., transmission control protocol (TCP), user datagram protocol (UDP), and/or the like), an application layer protocol (e.g., file transfer protocol (FTP), hypertext transfer protocol (HTTP), HTTP secure (HTTPS) (e.g., HTTP over SSL, HTTP over TLS, and/or the like) and/or the like), a portion of a packet payload (e.g., a first 50 bytes, a first 500 bytes, a first 1000 bytes, and/or the like), a sequence of packet lengths and/or arrival times, transitions in packet sizes, transitions in packet arrival times, and/or the like.

Network device 205, using DPI classifier component 220, may determine a DPI classification for traffic received by network device 205 (e.g., based on a plurality of application signatures included in DPI classifier component 220) in a manner similar to that described elsewhere herein. DPI classifier component 220 may provide information determined from the DPI classification (e.g., protocol information, such as a server name indication (SM) for TLS traffic) to assist feature extractor component 215. Network device 205, using ML classifier component 225, may determine a ML classification for traffic received by network device 205 (e.g., based on one or more features extracted by feature extractor component 215) in a manner similar to that described elsewhere herein.

Network device 205, using classification result evaluator component 230, may determine to accept the DPI classification of DPI classifier component 220 or the ML classification of ML classifier component 225 in a manner similar to that described elsewhere herein. Network device 205, using data exporter component 235, may export data to training platform 240.

As shown in FIG. 2, training platform 240 may include a data aggregator component 245, a data storage component 250, a training component 255, and a packaging component 260.

Training platform 240, using data aggregator component 245, may collect data from a plurality of network devices (e.g., a plurality of network devices that include network device 205), organize the data, modify the data, perform preprocessing on the data, and/or the like. Training platform 240, using data storage component 250, may store the data aggregated by data aggregator component 245. Data storage component 250 may include a data structure (e.g., a database, a linked list, a table, and/or the like) used to store the data.

Training platform 240, using training component 255, may train one or more ML models to be used by ML classifier component 225 of network device 205. For example, training component 255 may train an application classifier model, a traffic type classifier model, and/or an application identity classifier model similar to those described elsewhere herein. Training component 255 may train the one or more ML models using the data aggregated from the plurality of network devices (e.g., the data stored by data storage component 250) in a manner similar to that described elsewhere herein.

In some implementations, the application classifier model, the traffic type classifier model, and/or the application identity classifier model may learn to identify a previously unrecognized application, traffic type, and/or application identity, respectively. In such a case, training platform 240 may export (e.g., using packaging component 260) information relating to the previously unrecognized application, traffic type, and/or application identity to permit an administrator to label the previously unrecognized application, traffic type, and/or application identity, configure a security policy for the previously unrecognized application, traffic type, and/or application identity, and/or the like. For example, the traffic type classifier model may learn to identify a previously unrecognized traffic type. Continuing with the previous example, training platform 240 may export (e.g., using packaging component 260) information relating to the previously unrecognized traffic type to network device 205 to permit an administrator of network device 205 to configure a default security policy for the previously unrecognized traffic type. Network device 205 may automatically enforce the default security policy in connection with an unknown application of the previously unrecognized traffic type.

Training platform 240, using packaging component 260, may generate a package (e.g., a downloadable package) that includes one or more trained ML models (e.g., ML models trained by training component 255) and/or one or more updates to the ML models. Packaging component 260 may make the package available to network device 205 (e.g., in a repository of packaging component 260 that may be checked at regular or irregular intervals by network device 205 for new packages to download). Additionally, or alternatively, packaging component 260 may push the package to network device 205 at regular (e.g., daily, weekly, monthly, and/or the like) or irregular (e.g., after a training operation is performed by training component 255) intervals.

In some implementations, one or more components of training platform 240 may be included in network device 205 (e.g., network device 205 may include training component 255).

As indicated above, FIG. 2 is provided merely as an example. Other examples can differ from what is described with regard to FIG. 2. The number and arrangement of components shown in FIG. 2 are provided as one or more examples. In practice, there may be additional components, fewer components, different components, or differently arranged components than those shown in FIG. 2. Furthermore, two or more components shown in FIG. 2 may be implemented within a single device, or a single device shown in FIG. 2 may be implemented as multiple, distributed devices. Additionally, or alternatively, a set of devices (e.g., one or more devices) or components of example implementation 200 may perform one or more functions described as being performed by another set of devices or components of example implementation 200.

Figure 3:
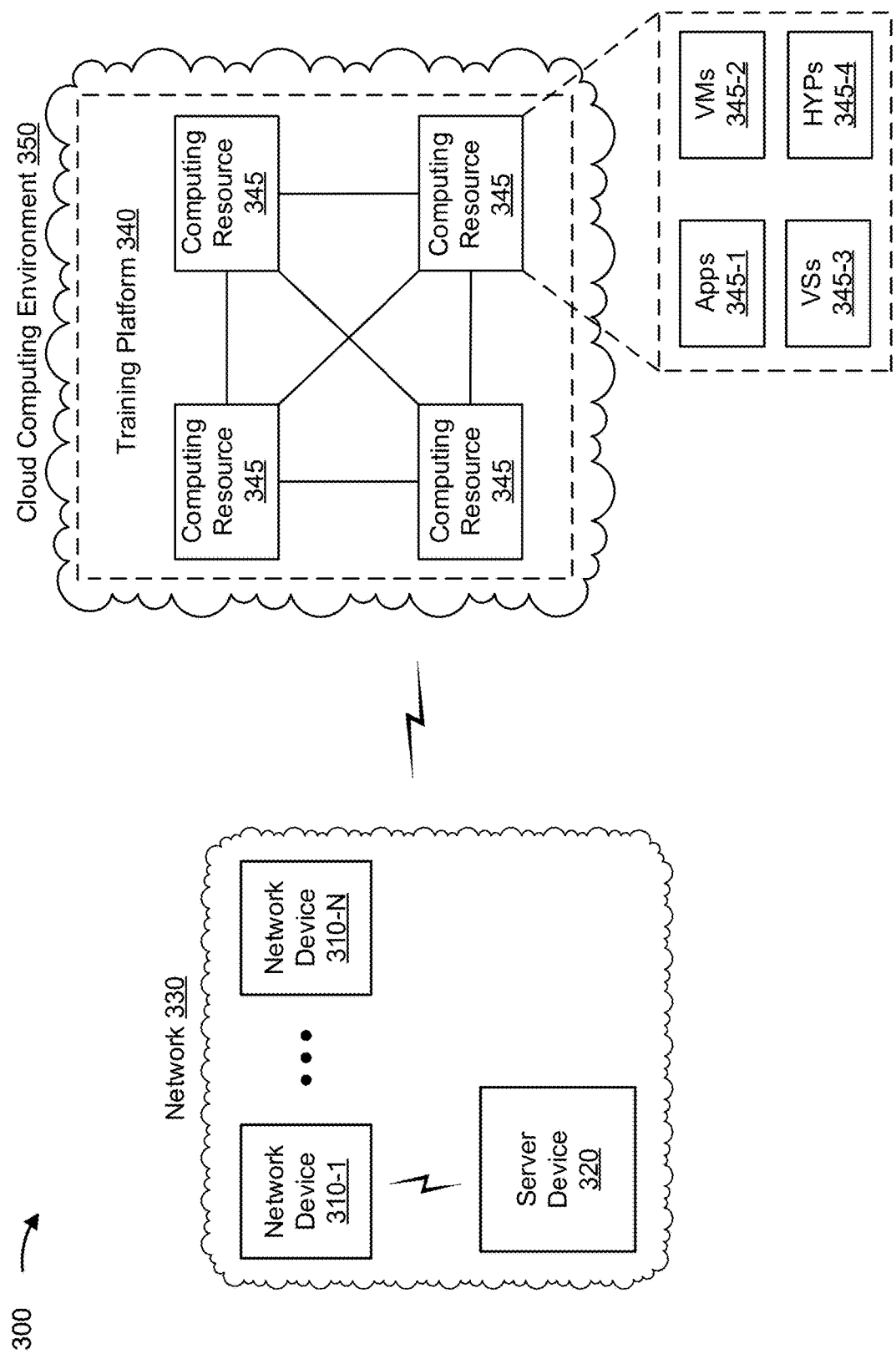
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more network devices 310-1 through 310-N (N≥1) (hereinafter referred to collectively as "network devices 310," and individually as "network device 310"), a server device 320, a network 330, a training platform 340, a computing resource 345, and a cloud computing environment 350. Devices of environment 300 may interconnect via wired connections, wireless connections, or a combination of wired and wireless connections.

Network device 310 includes one or more devices (e.g., one or more traffic transfer devices) capable of processing and/or transferring traffic between endpoint devices. For example, network device 310 may include a firewall, a router, a gateway, a switch device, a hub, a bridge, a reverse proxy, a server (e.g., a proxy server), a top of rack (ToR) switch, a load balancer, a switch interface board, a controller, a switching element, a packet processing component, or a similar device. In some implementations, network device 310 may perform classification of network traffic using a DPI classification technique and/or a ML classification technique, process network traffic according to a security policy, update the security policy, and/or the like.

In some implementations, network devices 310 may form a distributed architecture, such that a first network device 310 performs classification using a DPI classification technique and a second network device 310 performs classification using a ML classification technique. In some implementations, network device 310 may be a physical device implemented within a housing, such as a chassis. In some implementations, network device 310 may be a virtual device implemented by one or more computer devices of a cloud computing environment or a data center.

Server device 320 includes one or more devices capable of receiving, generating, storing, processing, and/or providing information, such as information described herein. For example, server device 320 may include a computing device, such as a server, a desktop computer, a laptop computer, a tablet computer, a handheld computer, or a similar device.

Network 330 includes one or more wired and/or wireless networks. For example, network 330 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Training platform 340 includes one or more computing resources associated with training models (e.g., machine learning models). For example, training platform 340 can be a platform implemented by cloud computing environment 350 that can train and/or update one or more models used to classify network traffic.

Training platform 340 can include one or more server devices. In some implementations, training platform 340 is implemented by computing resources 345 of cloud computing environment 350. Notably, while implementations described herein describe training platform 340 as being hosted in cloud computing environment 350, in some implementations, training platform 340 might not be cloud-based or can be partially cloud-based.

Cloud computing environment 350 includes an environment that delivers computing as a service, whereby shared resources, services, etc. can be provided to network device 310, server device 320, and/or the like. Cloud computing environment 350 can provide computation, software, data access, storage, and/or other services that do not require end-user knowledge of a physical location and configuration of a system and/or a device that delivers the services. As shown, cloud computing environment 350 can include training platform 340 and computing resource 345.

Computing resource 345 includes one or more personal computers, workstation computers, server devices, or another type of computation and/or communication device. In some implementations, computing resource 345 can host training platform 340. The cloud resources can include compute instances executing in computing resource 345, storage devices provided in computing resource 345, data transfer devices provided by computing resource 345, etc. In some implementations, computing resource 345 can communicate with other computing resources 345 via wired connections, wireless connections, or a combination of wired and wireless connections.

As further shown in FIG. 3, computing resource 345 can include a group of cloud resources, such as one or more applications ("APPs") 345-1, one or more virtual machines ("VMs") 345-2, virtualized storage ("VSs") 345-3, one or more hypervisors ("HYPs") 345-4, or the like.

Application 345-1 includes one or more software applications that may be provided to or accessed by network devices 310, server device 320, and/or the like. Application 345-1 may eliminate a need to install and execute the software applications on network devices 310, server device 320, and/or the like. For example, application 345-1 may include software associated with training platform 340 and/or any other software capable of being provided via cloud computing environment 350. In some implementations, one application 345-1 may send/receive information to/from one or more other applications 345-1, via virtual machine 345-2.

Virtual machine 345-2 includes a software implementation of a machine (e.g., a computer) that executes programs like a physical machine. Virtual machine 345-2 can be either a system virtual machine or a process virtual machine, depending upon use and degree of correspondence to any real machine by virtual machine 345-2. A system virtual machine can provide a complete system platform that supports execution of a complete operating system ("OS"). A process virtual machine can execute a single program and can support a single process. In some implementations, virtual machine 345-2 can execute on behalf of a user, and can manage infrastructure of cloud computing environment 350, such as data management, synchronization, or long-duration data transfers.

Virtualized storage 345-3 includes one or more storage systems and/or one or more devices that use virtualization techniques within the storage systems or devices of computing resource 345. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 345-4 provides hardware virtualization techniques that allow multiple operating systems (e.g., "guest operating systems") to execute concurrently on a host computer, such as computing resource 345. Hypervisor 345-4 can present a virtual operating platform to the guest operating systems and can manage the execution of the guest operating systems. Multiple instances of a variety of operating systems can share virtualized hardware resources.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
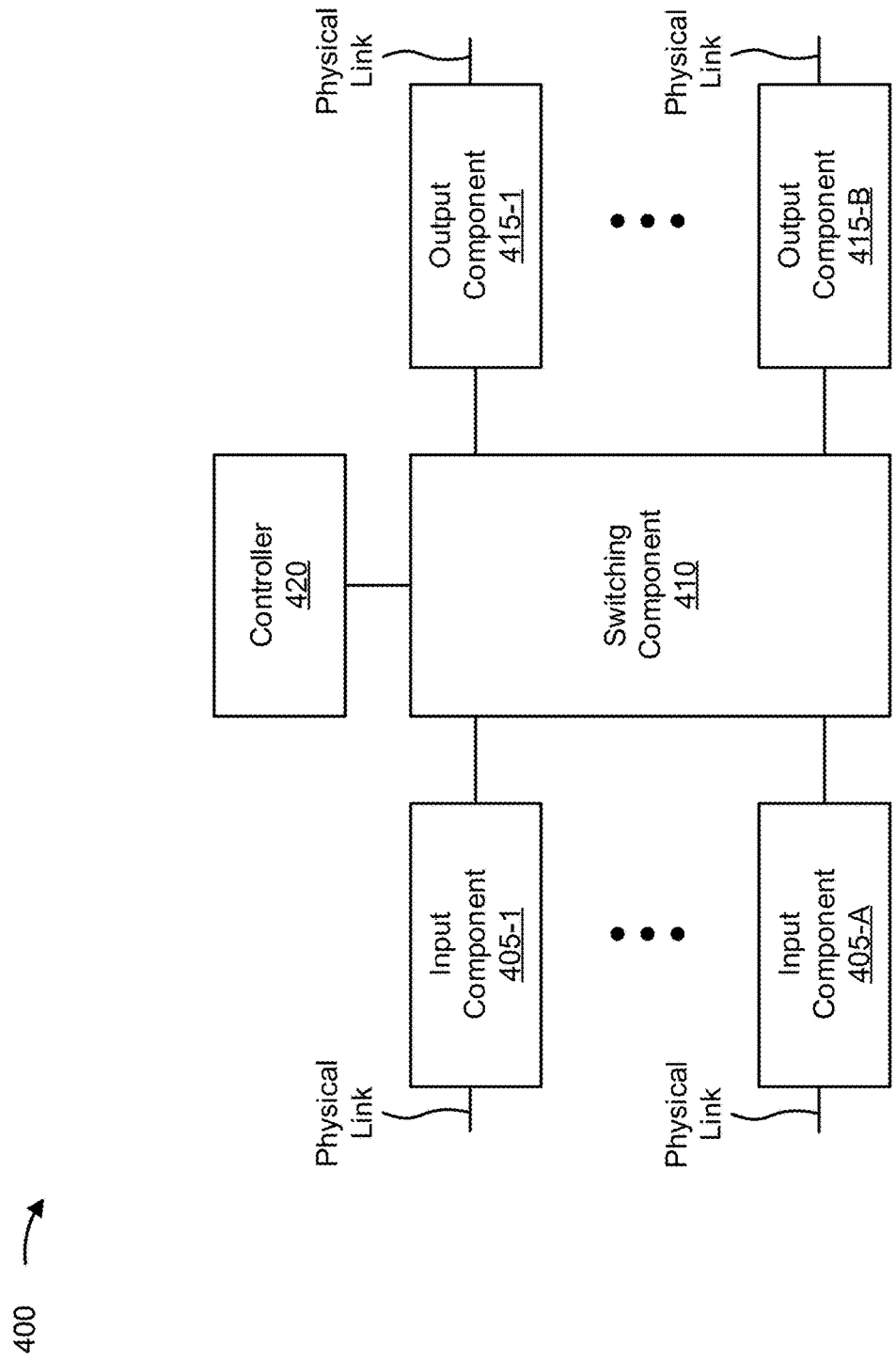
FIG. 4 is a diagram of example components of one or more devices of FIG. 3.

FIG. 4 is a diagram of example components of a device 400. Device 400 may correspond to network device 310, server device 320, training platform 340, and/or computing resource 345. In some implementations, network device 310, server device 320, training platform 340, and/or computing resource 345 may include one or more devices 400 and/or one or more components of device 400. As shown in FIG. 4, device 400 may include a set of input components 405, a switching component 410, a set of output components 415, and a controller 420. Components of device 400 may interconnect via wired connections, wireless connections, or a combination of wired and wireless connections.

Input component 405 may be a point of attachment for a physical link connected to device 400, and may be a point of entry for incoming traffic (e.g., packets) received by device 400. Input component 405 may process incoming traffic, such as by performing data link layer encapsulation or decapsulation. In some implementations, input component 405 may send and/or receive packets. In some implementations, input component 405 may include an input line card that includes one or more packet processing components (e.g., in the form of integrated circuits), such as one or more interface cards (IFCs), packet forwarding components, line card controller components, input ports, processors, memories, and/or input queues.

Switching component 410 may interconnect input components 405 and output components 415. In some implementations, switching component 410 may be implemented via one or more crossbars, via one or more busses, and/or using shared memory. The shared memory may act as a temporary buffer to store packets from input components 405 before the packets are eventually scheduled for delivery to output components 415. In some implementations, switching component 410 may enable input components 405, output components 415, and/or controller 420 to communicate.

Output component 415 may be a point of attachment for a physical link connected to device 400, and may be a point of exit for outgoing traffic (e.g., packets) transmitted by device 400. Output component 415 may store packets and/or may schedule packets for transmission on output physical links. Output component 415 may support data link layer encapsulation or decapsulation, and/or a variety of higher-level protocols. In some implementations, output component 415 may send packets and/or receive packets. In some implementations, output component 415 may include an output line card that includes one or more packet processing components (e.g., in the form of integrated circuits), such as one or more IFCs, packet forwarding components, line card controller components, output ports, processors, memories, and/or output queues. In some implementations, input component 405 and output component 415 may be implemented by the same set of components (e.g., an input/output component may be a combination of input component 405 and output component 415).

Controller 420 includes a processor in the form of, for example, a central processing unit (CPU), a microprocessor, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 420 may include one or more processors that can be programmed to perform a function.

In some implementations, controller 420 may include a random access memory (RAM), a read only memory (ROM), and/or another type of dynamic or static storage device (e.g., a flash memory, a magnetic memory, an optical memory, etc.) that stores information and/or instructions for use by controller 420.

In some implementations, controller 420 may communicate with other devices, networks, and/or systems connected to device 400 to exchange information regarding network topology. Controller 420 may create routing tables based on the network topology information, may create forwarding tables based on the routing tables, and may forward the forwarding tables to input components 405 and/or output components 415. Input components 405 and/or output components 415 may use the forwarding tables to perform route lookups for incoming and/or outgoing packets.

Controller 420 may perform one or more processes described herein. Controller 420 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 420 from another computer-readable medium or from another device via a communication interface. When executed, software instructions stored in a memory and/or a storage component associated with controller 420 may cause controller 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
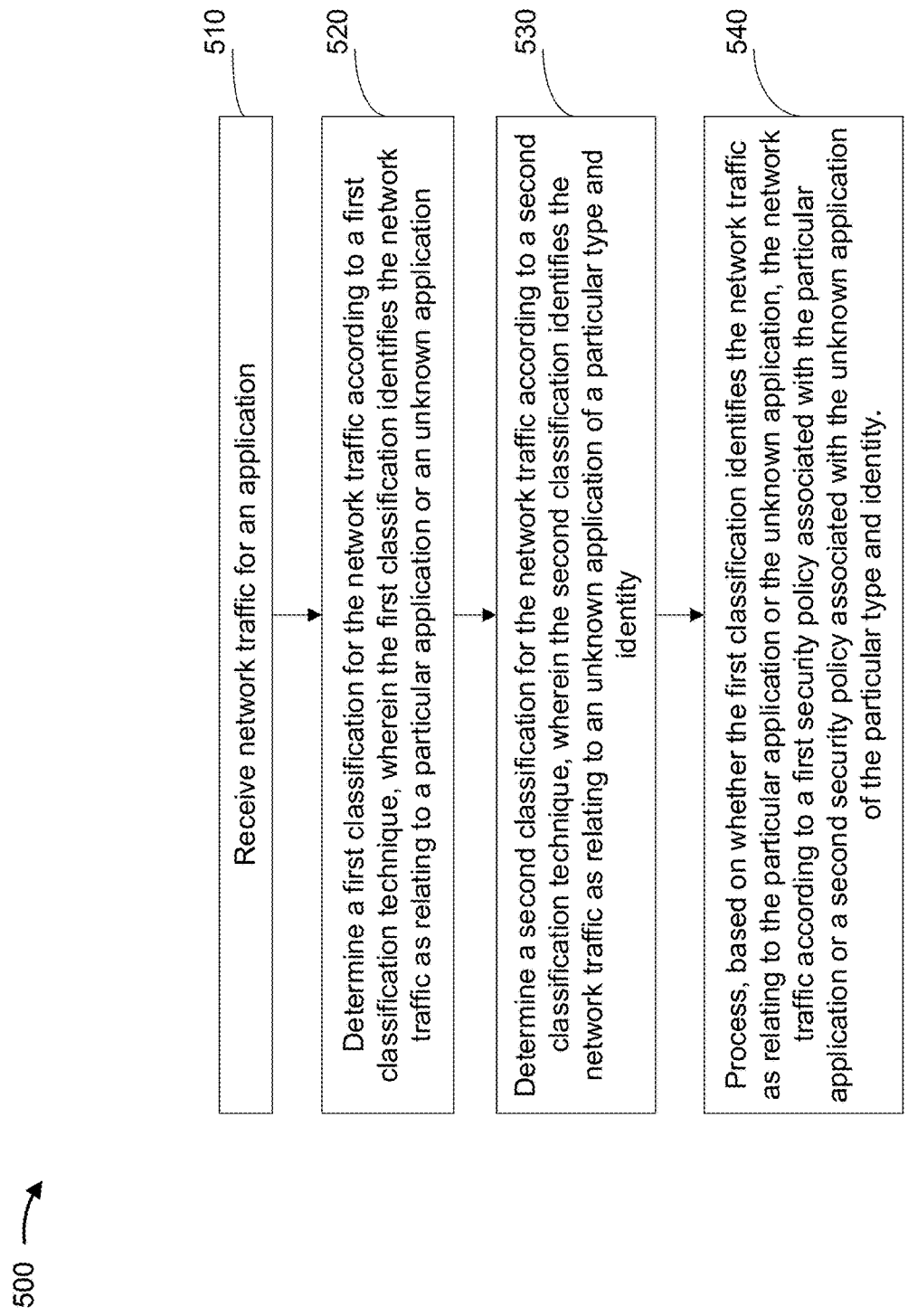

FIG. 5 is a flow chart of an example process 500 for classification of unknown network traffic. In some implementations, one or more process blocks of FIG. 5 may be performed by a network device (e.g., network device 310). In some implementations, one or more process blocks of FIG. 5 may be performed by another device or a group of devices separate from or including the network device, such as a server device (e.g., server device 320), a training platform (e.g., training platform 340), and/or the like.

As shown in FIG. 5, process 500 may include receiving network traffic for an application (block 510). For example, the network device (e.g., using input component 405, switching component 410, controller 420, and/or the like) may receive network traffic for an application, as described above.

As further shown in FIG. 5, process 500 may include determining a first classification for the network traffic according to a first classification technique, wherein the first classification identifies the network traffic as relating to a particular application or an unknown application (block 520). For example, the network device (e.g., using switching component 410, controller 420, and/or the like) may determine a first classification for the network traffic according to a first classification technique, as described above. In some implementations, the first classification identifies the network traffic as relating to a particular application or an unknown application.

As further shown in FIG. 5, process 500 may include determining a second classification for the network traffic according to a second classification technique, wherein the second classification identifies the network traffic as relating to an unknown application of a particular type and identity (block 530). For example, the network device (e.g., using switching component 410, controller 420, and/or the like) may determine a second classification for the network traffic according to a second classification technique, as described above. In some implementations, the second classification identifies the network traffic as relating to an unknown application of a particular type and identity.

As further shown in FIG. 5, process 500 may include processing, based on whether the first classification identifies the network traffic as relating to the particular application or the unknown application, the network traffic according to a first security policy associated with the particular application or a second security policy associated with the unknown application of the particular type and identity (block 540). For example, the network device (e.g., using switching component 410, output component 415, controller 420, and/or the like) may process, based on whether the first classification identifies the network traffic as relating to the particular application or the unknown application, the network traffic according to a first security policy associated with the particular application or a second security policy associated with the unknown application of the particular type and identity, as described above.

Process 500 may include additional implementations, such as any single implementation or any combination of implementations described below and/or in connection with one or more other processes described elsewhere herein.

In some implementations, the first classification technique may be a deep packet inspection classification technique and the second classification technique may be a machine learning classification technique. In some implementations, the second classification technique may include classifying, using a first machine learning model, the network traffic as a particular type of traffic, and determining, using a second machine learning model, a particular identity for the application based on the network traffic.

In some implementations, the unknown application of the particular type and identity is included in a group of unknown applications of the particular type, and the second security policy is associated with the group of unknown applications of the particular type. In some implementations, the network device may accept, to obtain an accepted classification, the first classification when the first classification identifies the network traffic as relating to the particular application, or the second classification when the first classification identifies the network traffic as relating to the unknown application. In such a case, the network device may process the network traffic according to the first security policy or the second security policy based on the accepted classification.

In some implementations, the particular application may be a first particular application, and the second classification may identify the application as the unknown application of the particular type and identity or a second particular application. In such a case, when accepting, to obtain the accepted classification, the network device may accept the first classification of the network traffic as relating to the first particular application when the first particular application corresponds to the second particular application, accept the first classification of the network traffic as relating to the first particular application when the network traffic is unencrypted, or accept the second classification of the network traffic as relating to the second particular application when the network traffic is encrypted. When processing the network traffic, the network device may process the network traffic according to the first security policy associated with the first particular application, the second security policy associated with the unknown application of the particular type and identity, or a third security policy associated with the second particular application.

In some implementations, the network traffic may be first network traffic and processing the network traffic may be according to the second security policy associated with the unknown application of the particular type and identity. In such a case, the network device may receive, after processing the first network traffic, second network traffic for the application, and determine a third classification for the second network traffic according to the first classification technique, where the third classification identifies the second network traffic as relating to the particular application. Furthermore, the network device may associate, based on the third classification, the second security policy (associated with the unknown application of the particular type and identity) with the particular application, and process the second network traffic according to the second security policy.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
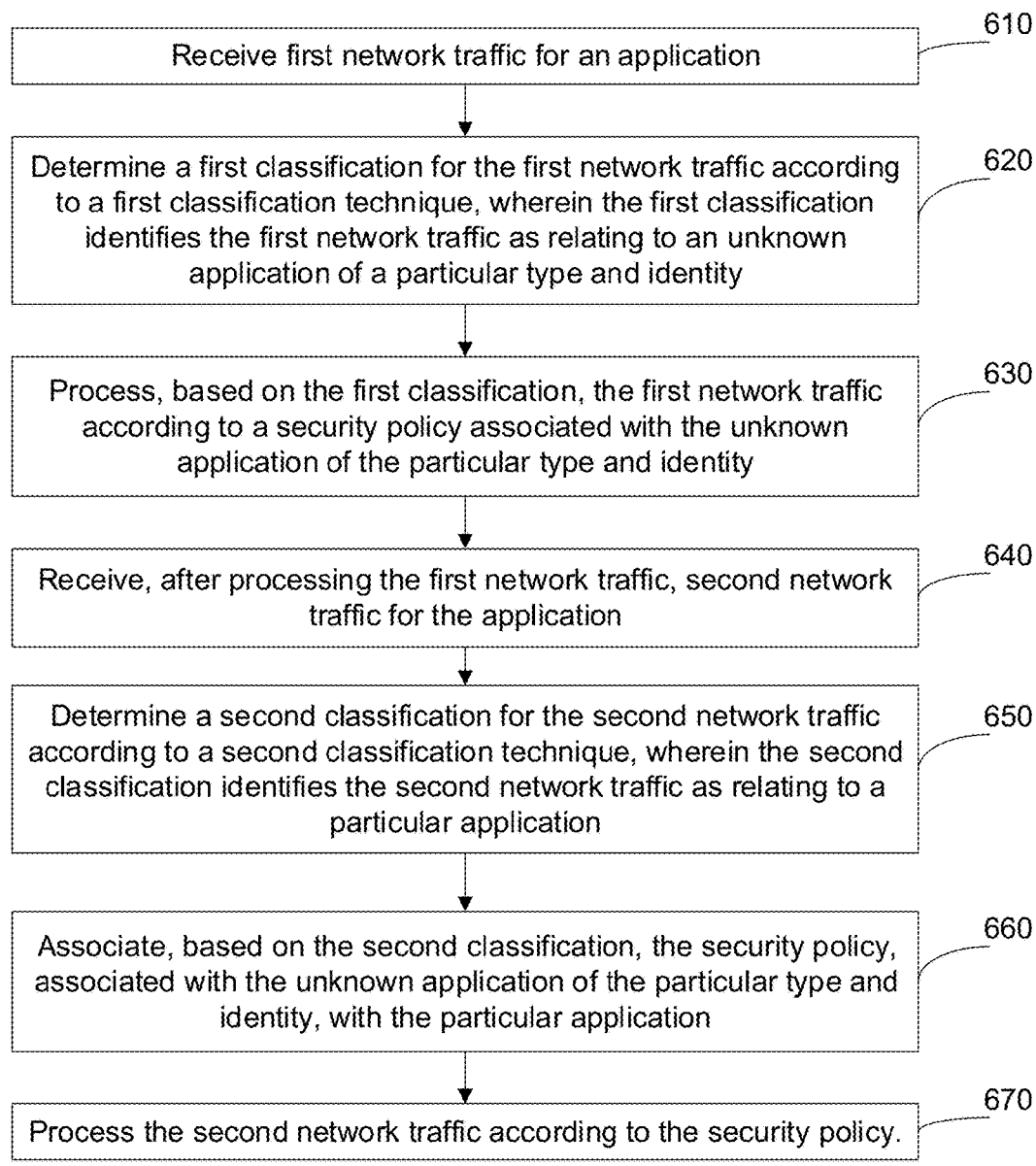

FIG. 6 is a flow chart of an example process 600 for classification of unknown network traffic. In some implementations, one or more process blocks of FIG. 6 may be performed by a network device (e.g., network device 310). In some implementations, one or more process blocks of FIG. 6 may be performed by another device or a group of devices separate from or including the network device, such as a server device (e.g., server device 320), a training platform (e.g., training platform 340), and/or the like.

As shown in FIG. 6, process 600 may include receiving first network traffic for an application (block 610). For example, the network device (e.g., using input component 405, switching component 410, controller 420, and/or the like) may receive first network traffic for an application, as described above.

As further shown in FIG. 6, process 600 may include determining a first classification for the first network traffic according to a first classification technique, wherein the first classification identifies the first network traffic as relating to an unknown application of a particular type and identity (block 620). For example, the network device (e.g., using switching component 410, controller 420, and/or the like) may determine a first classification for the first network traffic according to a first classification technique, as described above. In some implementations, the first classification identifies the first network traffic as relating to an unknown application of a particular type and identity.

As further shown in FIG. 6, process 600 may include processing, based on the first classification, the first network traffic according to a security policy associated with the unknown application of the particular type and identity (block 630). For example, the network device (e.g., using switching component 410, output component 415, controller 420, and/or the like) may process, based on the first classification, the first network traffic according to a security policy associated with the unknown application of the particular type and identity, as described above.

As further shown in FIG. 6, process 600 may include receiving, after processing the first network traffic, second network traffic for the application (block 640). For example, the network device (e.g., using input component 405, switching component 410, controller 420, and/or the like) may receive, after processing the first network traffic, second network traffic for the application, as described above.

As further shown in FIG. 6, process 600 may include determining a second classification for the second network traffic according to a second classification technique, wherein the second classification identifies the second network traffic as relating to a particular application (block 650). For example, the network device (e.g., using switching component 410, controller 420, and/or the like) may determine a second classification for the second network traffic according to a second classification technique, as described above. In some implementations, the second classification identifies the second network traffic as relating to a particular application.

As further shown in FIG. 6, process 600 may include associating, based on the second classification, the security policy, associated with the unknown application of the particular type and identity, with the particular application (block 660). For example, the network device (e.g., using switching component 410, controller 420, and/or the like) may associate, based on the second classification, the security policy, associated with the unknown application of the particular type and identity, with the particular application, as described above.

As further shown in FIG. 6, process 600 may include processing the second network traffic according to the security policy (block 670). For example, the network device (e.g., using switching component 410, output component 415, controller 420, and/or the like) may process the second network traffic according to the security policy, as described above.

Process 600 may include additional implementations, such as any single implementation or any combination of implementations described below and/or in connection with one or more other processes described elsewhere herein.

In some implementations, the first classification technique may be according to a plurality of machine learning models. In some implementations, the first classification technique may be according to machine learning and the second classification technique may be according to deep packet inspection.

In some implementations, the first classification technique may include classifying, using a first machine learning model, the first network traffic as a particular type of traffic, and determining, using a second machine learning model, a particular identity for the application based on the first network traffic. In some implementations, the particular identity for the application may be based on one or more features of the first network traffic.

In some implementations, the first classification technique may be according to one or more first features of the first network traffic and the second classification technique may be according to one or more second features of the second network traffic, and at least one feature may not be shared by the one or more first features and the one or more second features.

In some implementations, the network device may generate a record associating the unknown application of the particular type and identity with the particular application, where the record is to permit identification of the unknown application of the particular type and identity as the particular application.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for classification of unknown network traffic. In some implementations, one or more process blocks of FIG. 7 may be performed by a network device (e.g., network device 310). In some implementations, one or more process blocks of FIG. 7 may be performed by another device or a group of devices separate from or including the network device, such as a server device (e.g., server device 320), a training platform (e.g., training platform 340), and/or the like.

As shown in FIG. 7, process 700 may include receiving network traffic for an application (block 710). For example, the network device (e.g., using input component 405, switching component 410, controller 420, and/or the like) may receive network traffic for an application, as described above.

As further shown in FIG. 7, process 700 may include determining a first classification for the network traffic according to one or more first features of the network traffic, wherein the first classification identifies the network traffic as relating to a particular application or an unknown application (block 720). For example, the network device (e.g., using switching component 410, controller 420, and/or the like) may determine a first classification for the network traffic according to one or more first features of the network traffic, as described above. In some implementations, the first classification identifies the network traffic as relating to a particular application or an unknown application.

As further shown in FIG. 7, process 700 may include determining a second classification for the network traffic according to one or more second features of the network traffic, wherein the second classification identifies the network traffic as relating to an unknown application of a particular identity (block 730). For example, the network device (e.g., using switching component 410, controller 420, and/or the like) may determine a second classification for the network traffic according to one or more second features of the network traffic, as described above. In some implementations, the second classification identifies the network traffic as relating to an unknown application of a particular identity.

As further shown in FIG. 7, process 700 may include accepting, to obtain an accepted classification, the first classification when the first classification identifies the network traffic as relating to the particular application, or the second classification when the first classification identifies the network traffic as relating to the unknown application (block 740). For example, the network device (e.g., using switching component 410, controller 420, and/or the like) may accept, to obtain an accepted classification, the first classification when the first classification identifies the network traffic as relating to the particular application, or the second classification when the first classification identifies the network traffic as relating to the unknown application, as described above.

As further shown in FIG. 7, process 700 may include processing, based on the accepted classification, the network traffic according to a first security policy associated with the particular application or a second security policy associated with the unknown application of the particular identity (block 750). For example, the network device (e.g., using switching component 410, output component 415, controller 420, and/or the like) may process, based on the accepted classification, the network traffic according to a first security policy associated with the particular application or a second security policy associated with the unknown application of the particular identity, as described above.

Process 700 may include additional implementations, such as any single implementation or any combination of implementations described below and/or in connection with one or more other processes described elsewhere herein.

In some implementations, the first classification may be according to a first classification technique that uses the one or more first features and the second classification may be according to a second classification technique that uses the one or more second features. In some implementations, at least one feature may not be shared by the one or more first features and the one or more second features. In some implementations, the unknown application of the particular identity may be defined by the one or more second features of the network traffic. In some implementations, the second classification may identify the network traffic as relating to the unknown application of the particular identity and as relating to a particular type of traffic.

In some implementations, the network traffic may be first network traffic and the accepted classification may be the second classification for the network traffic as the unknown application of the particular identity. In such a case, the network device may receive, after processing the first network traffic, second network traffic for the application, and determine a third classification for the second network traffic according to the one or more first features of the second network traffic, where the third classification identifies the second network traffic as relating to the particular application. Furthermore, the network device may associate, based on the third classification, the second security policy (associated with the unknown application of the particular identity) with the particular application, and process the second network traffic according to the second security policy.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a network device, network traffic for an application;
   determining, by the network device, a first classification for the network traffic according to a first classification technique,
      wherein the first classification technique is a deep packet inspection classification technique that identifies the network traffic as relating to a known application if a signature of the network traffic corresponds to an application signature known to the network device, or an unknown application if the signature of the network traffic does not correspond to an application signature known by the network device;
   determining, by the network device, a second classification for the network traffic according to a second classification technique,
      wherein the second classification technique is a machine learning technique that identifies the network traffic as relating to an unknown application of a particular type and identity,
         wherein the particular type of traffic corresponds to a type of traffic associated with the unknown application, and
         wherein the identity differentiates between unknown applications of a same type; and
   processing, by the network device and based on whether the first classification identifies the network traffic as relating to the known application or the unknown application, the network traffic according to a first security policy associated with the known application or a second security policy associated with the unknown application of the particular type and identity.

2. The method of claim 1, wherein the second classification technique includes:
   classifying, using a first machine learning model, the network traffic as a particular type of traffic; and
   determining, using a second machine learning model, a particular identity for the application based on the network traffic.

3. The method of claim 1, wherein the unknown application of the particular type and identity is included in a group of unknown applications of the particular type,
   wherein the second security policy is associated with the group of unknown applications of the particular type.

4. The method of claim 1, further comprising:
   accepting, by the network device, to obtain an accepted classification:
      the first classification when the first classification identifies the network traffic as relating to the known application, or
      the second classification when the first classification identifies the network traffic as relating to the unknown application,
         wherein processing the network traffic according to the first security policy or the second security policy is based on the accepted classification.

5. The method of claim 4, wherein the known application is a first known application,
   wherein the second classification identifies the application as the unknown application of the particular type and identity or a second known application,
   wherein accepting, to obtain the accepted classification, further comprises:
      accepting the first classification of the network traffic as relating to the first known application when the first known application corresponds to the second known application;
      accepting the first classification of the network traffic as relating to the first known application when the network traffic is unencrypted, or
      accepting the second classification of the network traffic as relating to the second known application when the network traffic is encrypted; and
   wherein processing the network traffic comprises:
      processing the network traffic according to the first security policy associated with the first known application, the second security policy associated with the unknown application of the particular type and identity, or a third security policy associated with the second known application.

6. The method of claim 1, wherein the network traffic is first network traffic,
wherein processing the network traffic is according to the second security policy associated with the unknown application of the particular type and identity,
wherein the method further comprises:
receiving, after processing the first network traffic, second network traffic for the application;
determining a third classification for the second network traffic according to the first classification technique,
wherein the third classification identifies the second network traffic as relating to the known application;
associating, based on the third classification, the second security policy, associated with the unknown application of the particular type and identity, with the known application; and
processing the second network traffic according to the second security policy.

7. The method of claim 1, wherein processing the network traffic according to a first security policy associated with the known application or a second security policy associated with the unknown application of the particular type and identity comprises:
processing the network traffic according to the first security policy,
wherein the first security policy allows or blocks traffic associated with the known application when the first classification identifies the network traffic as related to the known application, and
processing the network traffic according to the second security policy,
wherein the second security policy allows or blocks traffic associated with the unknown application of the particular type and identity when the first classification identifies the network traffic as related to the unknown application.

8. A network device, comprising:
one or more memories; and
one or more processors to:
receive first network traffic for an application;
determine a first classification for the first network traffic according to a first classification technique,
wherein the first classification technique is a machine learning technique that identifies the first network traffic as relating to an unknown application of a particular type and identity,
wherein the particular type of traffic corresponds to a type of traffic associated with the unknown application, and
wherein the identity differentiates between unknown applications of a same type;
process, based on the first classification, the first network traffic according to a security policy associated with the unknown application of the particular type and identity;
receive, after processing the first network traffic, second network traffic for the application;
determine a second classification for the second network traffic according to a second classification technique,
wherein the second classification technique is a deep packet inspection classification technique that identifies the second network traffic as relating to a known application if a signature of the second network traffic corresponds to an application signature known to the network device;
associate, based on the second classification, the security policy, associated with the unknown application of the particular type and identity, with the known application; and
process the second network traffic according to the security policy.

9. The network device of claim 8, wherein the first classification technique is according to a plurality of machine learning models.

10. The network device of claim 8, wherein the first classification technique includes:
classifying, using a first machine learning model, the first network traffic as a particular type of traffic; and
determining, using a second machine learning model, a particular identity for the application based on the first network traffic.

11. The network device of claim 10, wherein the particular identity for the application is based on one or more features of the first network traffic.

12. The network device of claim 8, wherein the first classification is determined according to one or more first features of the first network traffic and the second classification is determined according to one or more second features of the second network traffic,
wherein at least one feature is not shared by the one or more first features and the one or more second features.

13. The network device of claim 8, wherein the one or more processors are further to:
generate a record associating the unknown application of the particular type and identity with the known application,
wherein the record is to permit identification of the unknown application of the particular type and identity as the known application.

14. The network device of claim 8, wherein the one or more processors when, processing the second network traffic according to the security policy, are to:
process the second network traffic according to the security policy,
wherein the security policy allows or blocks traffic associated with the known application when the second classification identifies the network traffic as related to the known application.

15. A non-transitory computer-readable medium storing instructions, the instructions comprising:
one or more instructions that, when executed by one or more processors, cause the one or more processors to:
receive network traffic for an application;
determine a first classification for the network traffic according to one or more first features of the network traffic,
wherein the first classification technique is a deep packet inspection classification technique that identifies the network traffic as relating to a known application if a signature of the network traffic corresponds to a known application signature, or an unknown application if the signature of the network traffic does not correspond to a known application signature;
determine a second classification for the network traffic according to one or more second features of the network traffic, wherein the second classification technique is a machine learning technique that identifies the network traffic as relating to an unknown application of a particular type and identity,
wherein the particular type of traffic corresponds to a type of traffic associated with the unknown application, and
wherein the identity differentiates between unknown applications of a same type;
accept, to obtain an accepted classification:
the first classification when the first classification identifies the network traffic as relating to the known application, or
the second classification when the first classification identifies the network traffic as relating to the unknown application; and
process, based on the accepted classification, the network traffic according to a first security policy associated with the known application or a second security policy associated with the unknown application of the particular identity.

16. The non-transitory computer-readable medium of claim 15, wherein the first classification is according to a first classification technique that uses the one or more first features and the second classification is according to a second classification technique that uses the one or more second features.

17. The non-transitory computer-readable medium of claim 15, wherein at least one feature is not shared by the one or more first features and the one or more second features.

18. The non-transitory computer-readable medium of claim 15, wherein the unknown application of the particular identity is defined by the one or more second features of the network traffic.

19. The non-transitory computer-readable medium of claim 15, wherein the second classification identifies the network traffic as relating to the unknown application of a particular identity and as relating to a particular type of traffic.

20. The non-transitory computer-readable medium of claim 15, wherein the network traffic is first network traffic and the accepted classification is the second classification for the first network traffic as the unknown application of the particular identity,
wherein the one or more instructions, when executed by the one or more processors, further cause the one or more processors to:
receive, after processing the first network traffic, second network traffic for the application;
determine a third classification for the second network traffic according to the one or more first features of the second network traffic,
wherein the third classification identifies the second network traffic as relating to the known application;
associate, based on the third classification, the second security policy, associated with the unknown application of the particular identity, with the known application; and
process the second network traffic according to the second security policy.

* * * * *